(No Model.)

F. R. PEARSON.
FIRE KINDLER.

No. 530,716. Patented Dec. 11, 1894.

Witnesses

Inventor
Fletcher R. Pearson,
By R.S. & A.P. Lacey
Attorneys

UNITED STATES PATENT OFFICE.

FLETCHER R. PEARSON, OF VANCOUVER, WASHINGTON.

FIRE-KINDLER.

SPECIFICATION forming part of Letters Patent No. 530,716, dated December 11, 1894.

Application filed August 15, 1894. Serial No. 520,389. (No model.)

*To all whom it may concern:*

Be it known that I, FLETCHER R. PEARSON, a citizen of the United States, residing at Vancouver, in the county of Clarke and State of Washington, have invented certain new and useful Improvements in Fire-Kindlers; and I do hereby declare the following to be a full, clear, and exact description of the invention, such as will enable others skilled in the art to which it appertains to make and use the same.

This invention is an improved fire kindler and relates to that class thereof in which a non combustible compound is saturated with oil and then lighted, to kindle the fire.

The object of my invention is to provide a device that shall be very simple and cheap and one in which ashes, earth or other cheap material can be used as the absorbent compound.

Another object is to provide a novel means for extinguishing the flame after it has served its purpose.

My invention consists in certain details of construction and combination of parts all of which will be fully explained hereinafter and pointed out in the claim.

Figure 1:
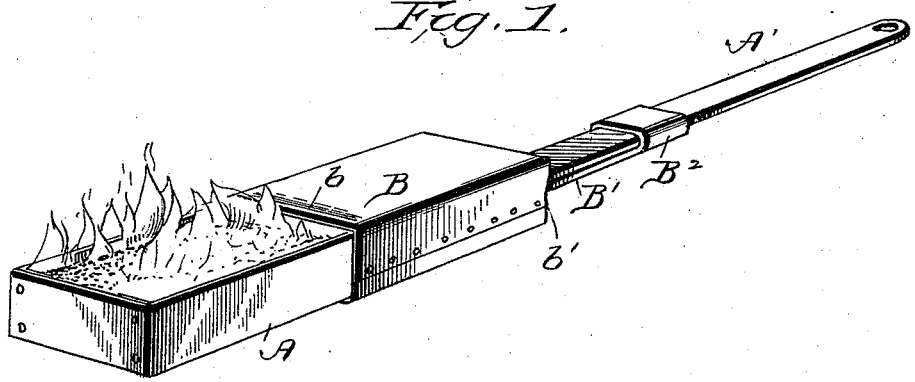
Figure 2:
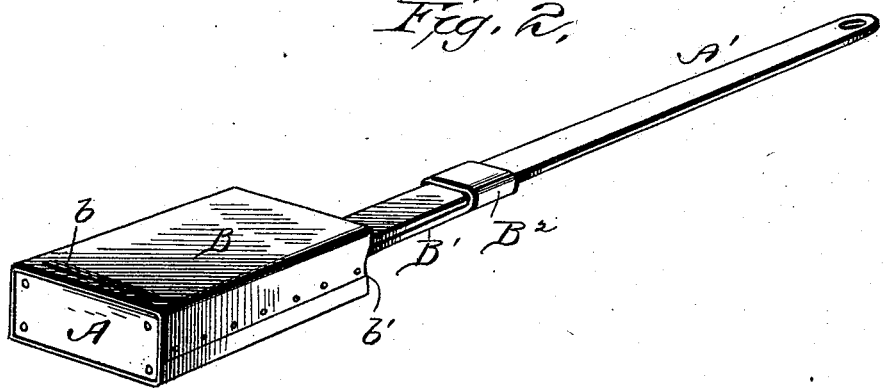
Figure 3:
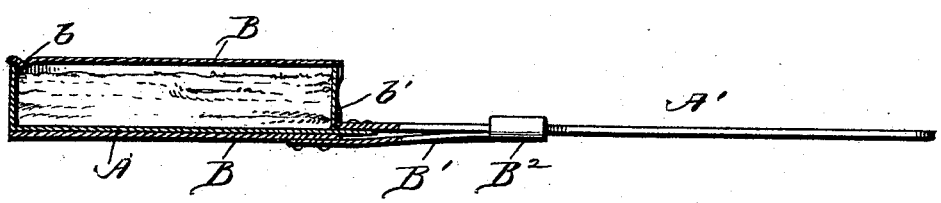

In the drawings forming a part of this specification, Figure 1 is a perspective view showing the device in use. Fig. 2 is a similar view showing the sleeve or cover upon the pan. Fig. 3 is a longitudinal sectional view.

In carrying out my invention I employ a pan A, formed of a single piece of sheet metal the sides and ends being crimped or riveted together on the ends so that the heat will not interfere with the joints, the sides being smooth. Connected with the pan A is a handle A' which is also made of metal and may be integral with the pan or attached thereto as desired. Said pan or said pan and handle may be made also of cast iron.

B indicates a sleeve or hood which slides upon the handle A' and over the pan to cover the same and extinguish the flames. This sleeve is also made of sheet metal and riveted together and projecting rearward from said sleeve is an arm B' carrying a guide B² through which slides the handle A'.

The sleeve B is crimped or depressed at $b$, to prevent the pan sliding out at either end.

In operation the pan is filled with ashes or other non combustible material and the mass saturated with oil and lighted. The kindler is then placed in the stove or under or in front of grate and allowed to remain there until the fire is burning well. The sleeve all this time is of course slid back upon the handle to expose the pan, but when the kindler is removed from the stove the sleeve is slid up to cover the pan and the flames are thus extinguished.

Having thus described my invention, what I claim, and desire to secure by Letters Patent, is—

An improved fire kindler consisting of a pan A, formed of a single piece of sheet metal, and provided with a metallic handle A', an enveloping sleeve B, formed also of a single piece of sheet metal, and provided with an arm B', carrying a guide B², which slides upon the handle A', the sleeve B, being open at each end to slide upon the pan A, said sleeve having a depression $b$, in its upper face, and a crimp or bend $b'$, in its side at the rear end, whereby the movements of said sleeve upon the pan are limited, substantially as shown and described.

In testimony whereof I affix my signature in presence of two witnesses.

FLETCHER R. PEARSON.

Witnesses:
 JOHN O'KEANE,
 HENRY CHRIST.